(12) United States Patent
Ooya et al.

(10) Patent No.: US 6,851,959 B2
(45) Date of Patent: Feb. 8, 2005

(54) CARD CONNECTOR

(75) Inventors: Masaaki Ooya, Yokohama (JP); Kiyoshi Abe, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 89 days.

(21) Appl. No.: 10/212,869

(22) Filed: Aug. 7, 2002

(65) Prior Publication Data

US 2003/0032317 A1 Feb. 13, 2003

(30) Foreign Application Priority Data

Aug. 10, 2001 (JP) ........................................ 2001-244891

(51) Int. Cl.[7] .............................................. H01R 13/62
(52) U.S. Cl. ...................................... 439/159; 439/630
(58) Field of Search ................................ 439/630, 607, 439/188, 159, 157, 689, 325–328, 152, 153, 459

(56) References Cited

U.S. PATENT DOCUMENTS

| 5,456,610 | A | * | 10/1995 | Banakis et al. ............. 439/157 |
| 5,695,351 | A | * | 12/1997 | Kimura et al. .............. 439/159 |
| 5,967,811 | A | * | 10/1999 | Yamamoto et al. ......... 439/159 |
| 6,068,516 | A | * | 5/2000 | Chang ......................... 439/633 |
| 6,083,018 | A | * | 7/2000 | Hara et al. ................... 439/159 |
| 6,155,853 | A | * | 12/2000 | Kajiura ........................ 439/159 |
| 6,231,360 | B1 | * | 5/2001 | Horie ........................... 439/159 |
| 6,270,365 | B1 | * | 8/2001 | Nishioka ...................... 439/159 |
| 6,361,339 | B1 | * | 3/2002 | Zhang et al. ................ 439/160 |
| 6,364,674 | B1 | * | 4/2002 | Kajiura ........................ 439/159 |
| 6,482,030 | B1 | * | 11/2002 | Kuo ........................ 439/541.5 |
| 6,540,560 | B1 | * | 4/2003 | Ito et al. ...................... 439/663 |

* cited by examiner

Primary Examiner—P. Austin Bradley
Assistant Examiner—X. Chung-Trans
(74) Attorney, Agent, or Firm—Finnegan, Henderson, Farabow, Garrett & Dunner, LLP

(57) ABSTRACT

A card connector for an IC card according to the present invention is provided with a preventive wall of an anti-floating mechanism in an ejector mechanism on a substrate, for suppressing the floating-up of the inserted IC card. Also, projections of an erroneous insert prevention mechanism for inhibiting the opposite insert of the card are provided with a sheet metal cover to prevent the IC card from floating up or being erroneously inserted, so that the IC card is not damaged and no short-circuit accident occurs. The card connector for an IC card is constructed into a hollow flat housing formed of a substrate and a metal sheet cover combined therewith, having the anti-floating mechanism for suppressing the floating-up of the IC card and the erroneous insert prevention mechanism for preventing the IC card from being inserted in such a manner that the rear end is directed forward.

13 Claims, 10 Drawing Sheets

CARD CONNECTOR

BACKGROUND OF THE INVENTION

This application is based on Patent Application No. 2001-244891 filed Aug. 10, 2001 in Japan, the content of which is incorporated herein by reference.

FIELD OF THE INVENTION

The present invention relates to a card connector, particularly to an IC card connector in which the IC card is to be inserted.

DESCRIPTION OF THE RELATED ART

Recently, an IC card in which an IC part called as an IC chip is incorporated has been increasingly used, and therefore a card connector for inserting the IC card has been widely required. The conventional card connector of such a type is constructed of a substrate and a cover and is required to have a small height as a whole and a sufficient strength for withstanding the insert and withdrawal of the IC card in response to the market demand. Further, this card connector is required to have a strength capable of holding the IC card and durable against the wrench by the IC card. To achieve this strength, the card connector comprises a sheet metal cover on a top surface of the substrate in such a manner that the plate is incorporated with the substrate of the card connector. There is a similar requirement in a so-called reverse type IC card in which the IC card is used in a reversal manner. Accordingly, a small height of the card connector and a strength durable against the wrench by the IC card are demanded and a metallic plate is used on a top surface of the card connector for achieving this requirement.

In these IC cards, a thickness tolerance of a single IC card is determined by a specification, and such thickness tolerance of the IC card is widely determined. If the thickness tolerance has the worst value, a depth of a groove in a pad section may be shallower relative to an outer surface of an IC card. Also, a height of a projection must be further smaller than the depth of the groove so that the projection is not brought into contact with the pad section, whereby the height of the projection becomes approximately equal to a curvature (R) of the profile of the IC card. This easily causes the IC card to ride on the projection to buckle a contact when the card is oppositely inserted (that is, the rear end of the card is directed forward).

IC cards now on a market are of a large thickness tolerance to have various thickness values. If a height of the projection is determined by the actual thickness value of the IC card, it is possible to prevent the IC card from being oppositely inserted. In such a case, however, when the IC card having a much worse thickness tolerance is on a market, the projection made of sheet metal may be brought into contact with the pad of the IC card to cause electric troubles such as a short-circuit.

Accordingly, an object of the present invention is to solve the above-mentioned problems in the prior art by providing a card connector for an IC card, in which a preventive wall of an anti-floating mechanism is provided in an ejector mechanism on a substrate for suppressing a floating-up of an IC card inserted in a card connector and an erroneous insert prevention mechanism is provided on a sheet metal cover for interfering the opposite insert of the IC card, so that the IC card is prevented from floating-up or being erroneously inserted to be damaged or the short-circuit does not occur.

SUMMARY OF THE INVENTION

To achieve the above object, a card connector for an IC card according to the present invention includes a substrate and a sheet metal cover combined with the substrate to form a flat hollow housing, an ejector mechanism provided on one side of the substrate, and an anti-floating mechanism provided for suppressing the floating-up of the IC card, whereby, the anti-floating mechanism can be provided in a simple and proper manner and the floating-up and riding-on of the IC card due to the wrench and twist of the card connector when the IC card is inserted are favorably inhibited; therefore the IC card is prevented from moving upward.

The card connector for an IC card according to the present invention is provided with the anti-floating mechanism having a preventive wall extending from a wall of the ejector mechanism in the lateral direction to position above a pad of the IC card; therefore, the preventive wall can be provided in a simple and easy manner to favorably inhibit the floating-up or the riding-on of the IC card due to the wrench and twist of the card connector when the IC card is inserted, whereby the IC card is prevented from moving upward.

Further, the card connector for an IC card according to the present invention is provided with an erroneous insert prevention mechanism in addition to the anti-floating mechanism, for stopping the IC card erroneously inserted in such a manner that the rear end of the card is directed forward, by the abutment of the rear end of the IC card thereto; therefore, the erroneous insert of the IC card such as an opposite insert in which the rear end is directed forward can be properly and favorably prevented.

In the card connector for an IC card according to the present invention, since the erroneous insert prevention mechanism has at least one projection formed in the sheet metal cover, the projection can be simply and easily provided, and also the card connector can be easily manufactured at a low cost.

In the card connector for an IC card according to the present invention, since the projection is formed by bending a portion of the sheet metal cover inward, the projection can be easily and simply manufactured.

In the card connector for an IC card according to the present invention, since the projection is covered with synthetic resin, the excessively inserted IC card is prevented from riding over of the projection to favorably protect the IC card. Also, the following effects are obtainable; the resilient contact piece is prevented from buckling, no short-circuit accident occurs, and the erroneous insert such as opposite insert in which the rear end is directed forward is prevented.

The card connector for an IC card according to the present invention is provided with the preventive wall of the anti-floating mechanism on the other side wall of the substrate to extend above the pad of the IC card to suppress the floating-up of the IC card, the floating-up and riding-on of the IC card due to the wrench and twist of the card connector when the IC card is inserted are favorably inhibited, whereby the IC card is prevented from moving upward.

The above and other objects, effects, features and advantages of the present invention will become more apparent from the following description of embodiments thereof taken in conjunction with the accompanying drawings.

DETAILED DESCRIPTION OF PREFERRED EMBODIMENTS

First Embodiment

Figure 1:
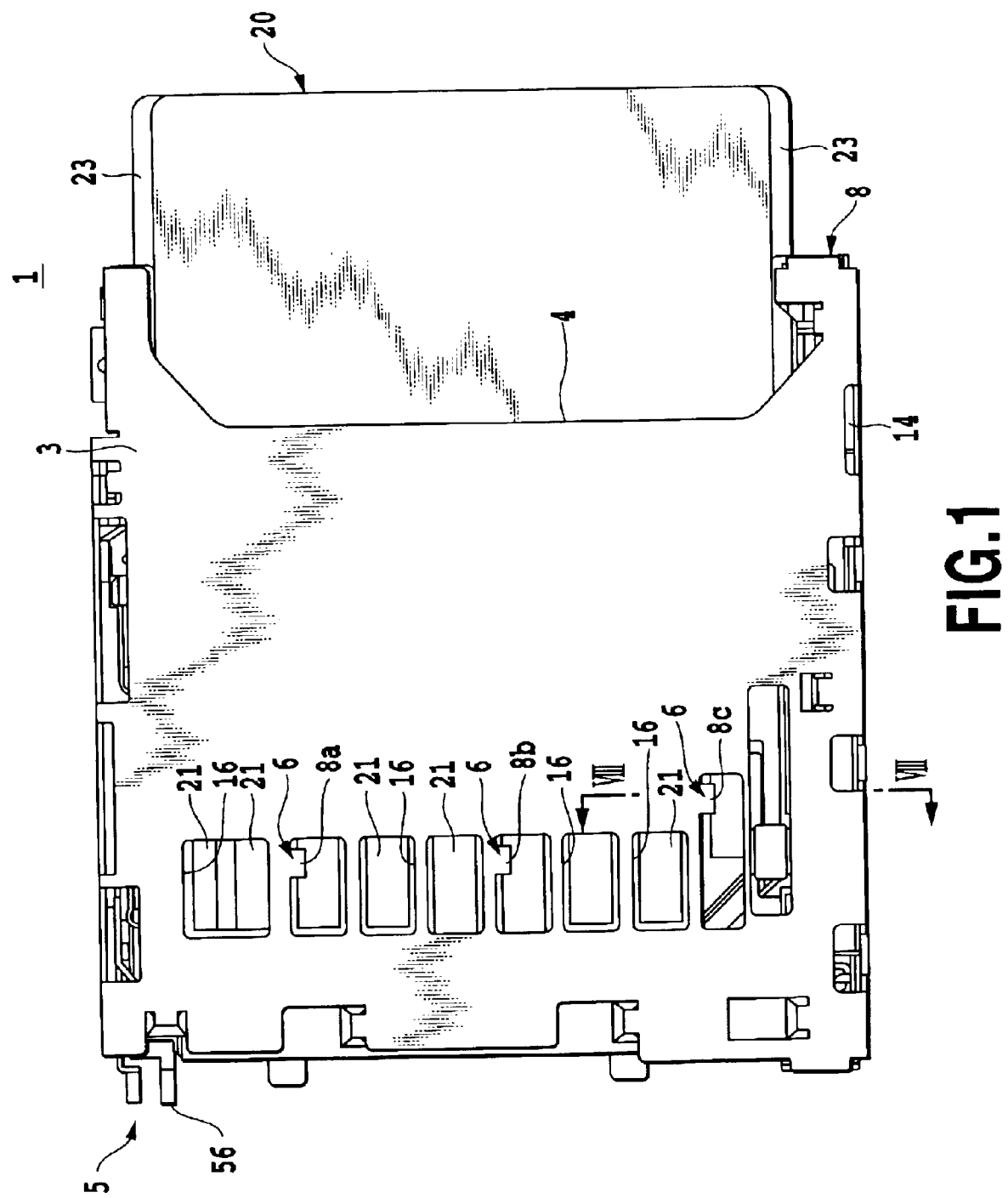
FIG. 1 is a plan view of a card connector for an IC card according to the present invention in which an IC card is inserted therein.
Figure 2:
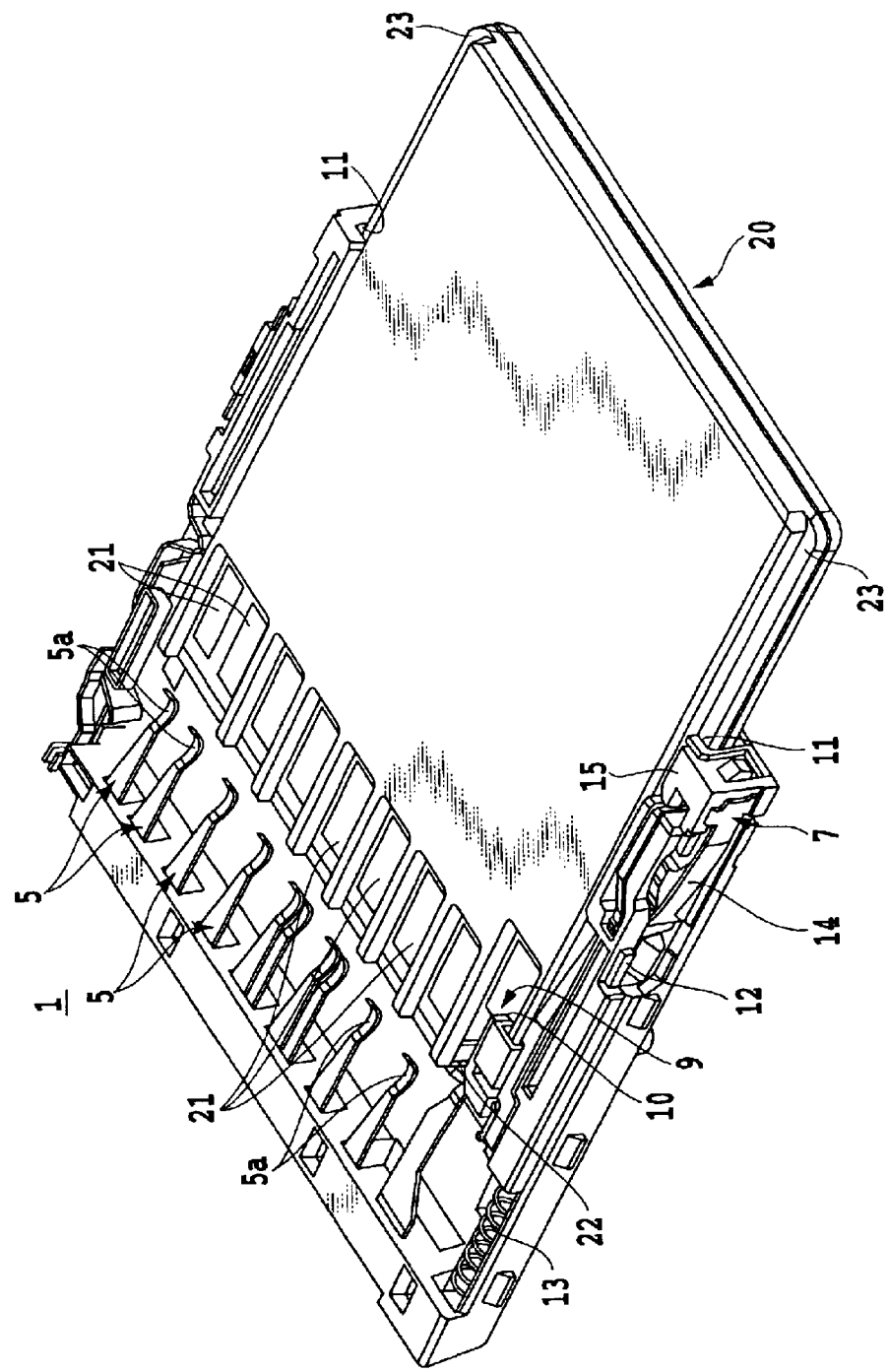
FIG. 2 is a perspective view of the card connector for an IC card according to the present invention shown in FIG. 1 from which a sheet metal cover is removed.
Figure 3:
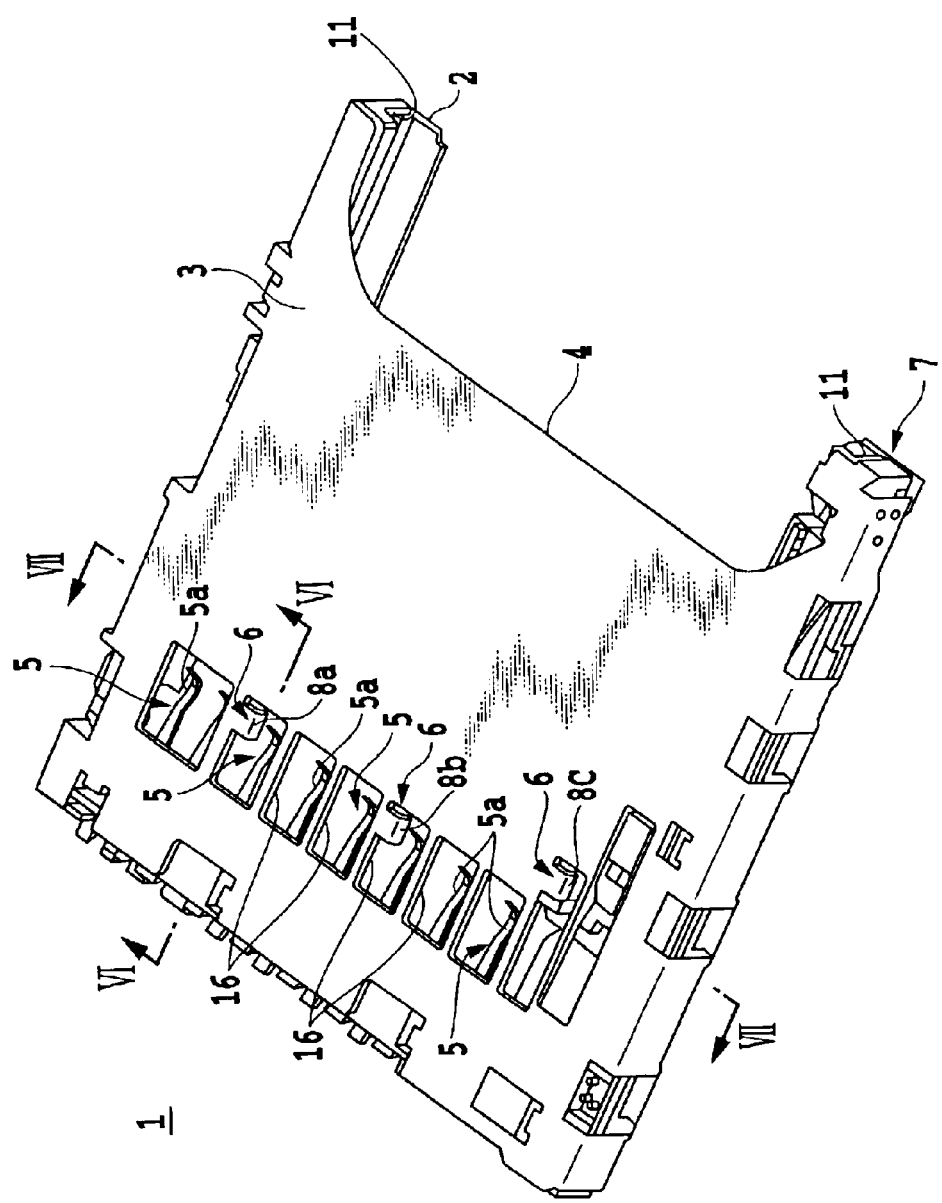
FIG. 3 is a perspective view of the card connector for an IC card from which the IC card is removed.
Figure 4:
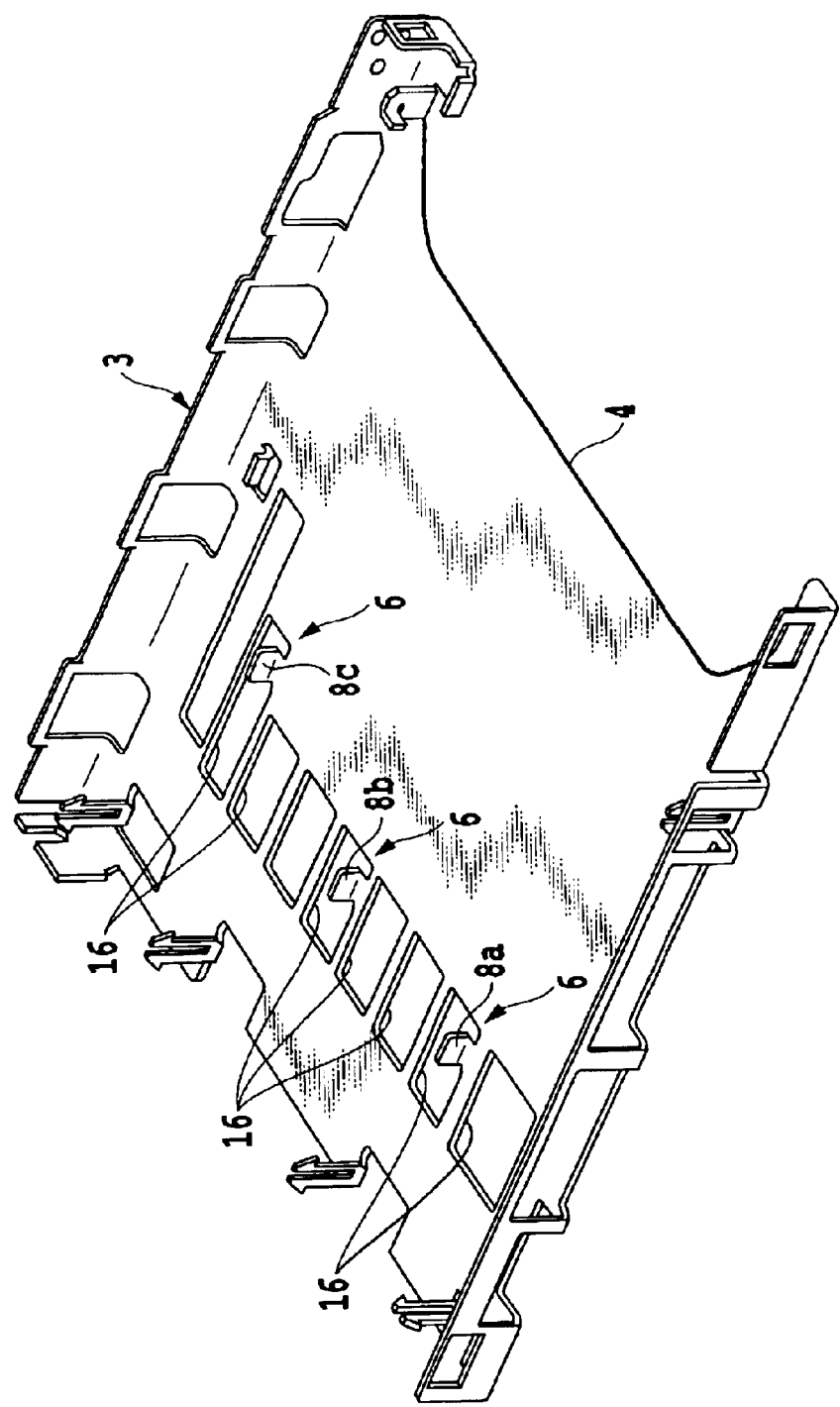
FIG. 4 is a perspective view of a sheet metal cover of the card connector for an IC card according to the present invention shown in FIG. 3, in which the sheet metal cover is turned over to show projections provided thereon.
Figure 5:
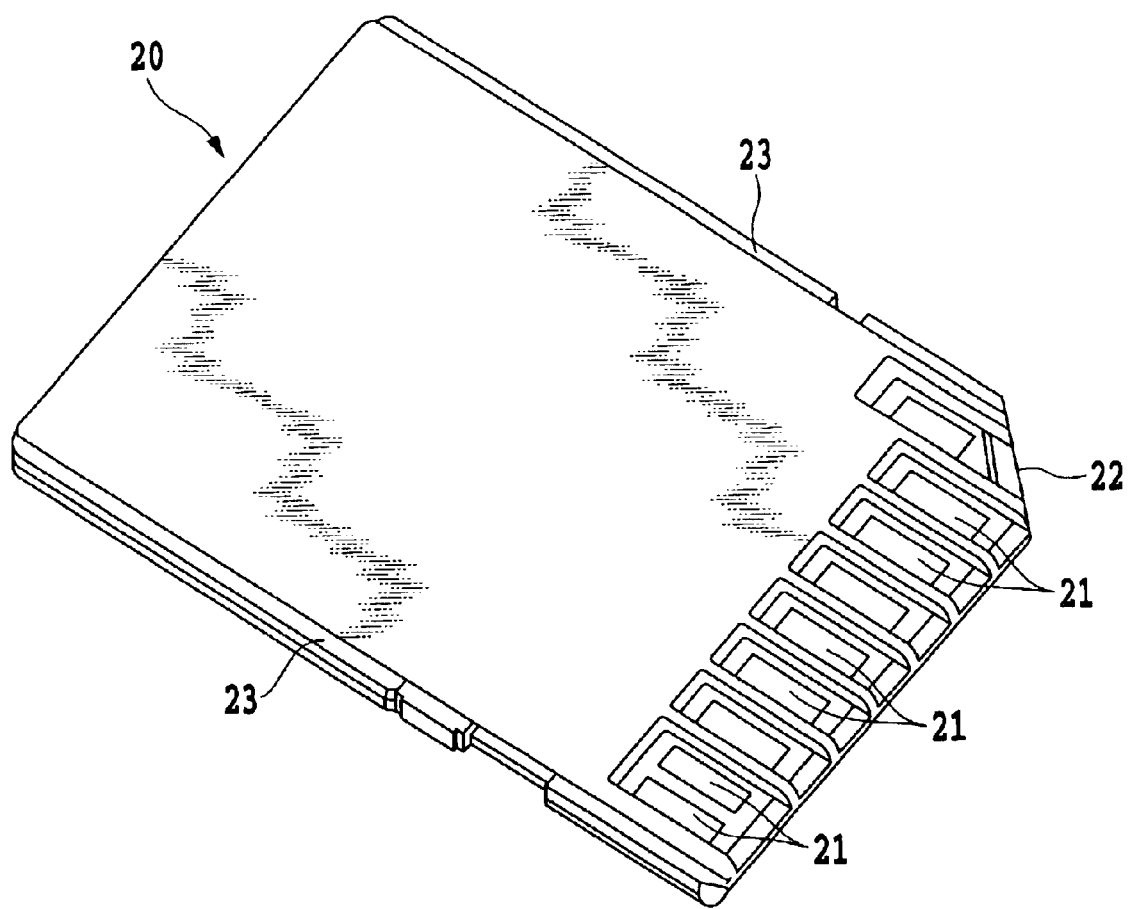
FIG. 5 is a perspective view of an IC card used for the card connector for an IC card according to the present invention.
Figure 6:
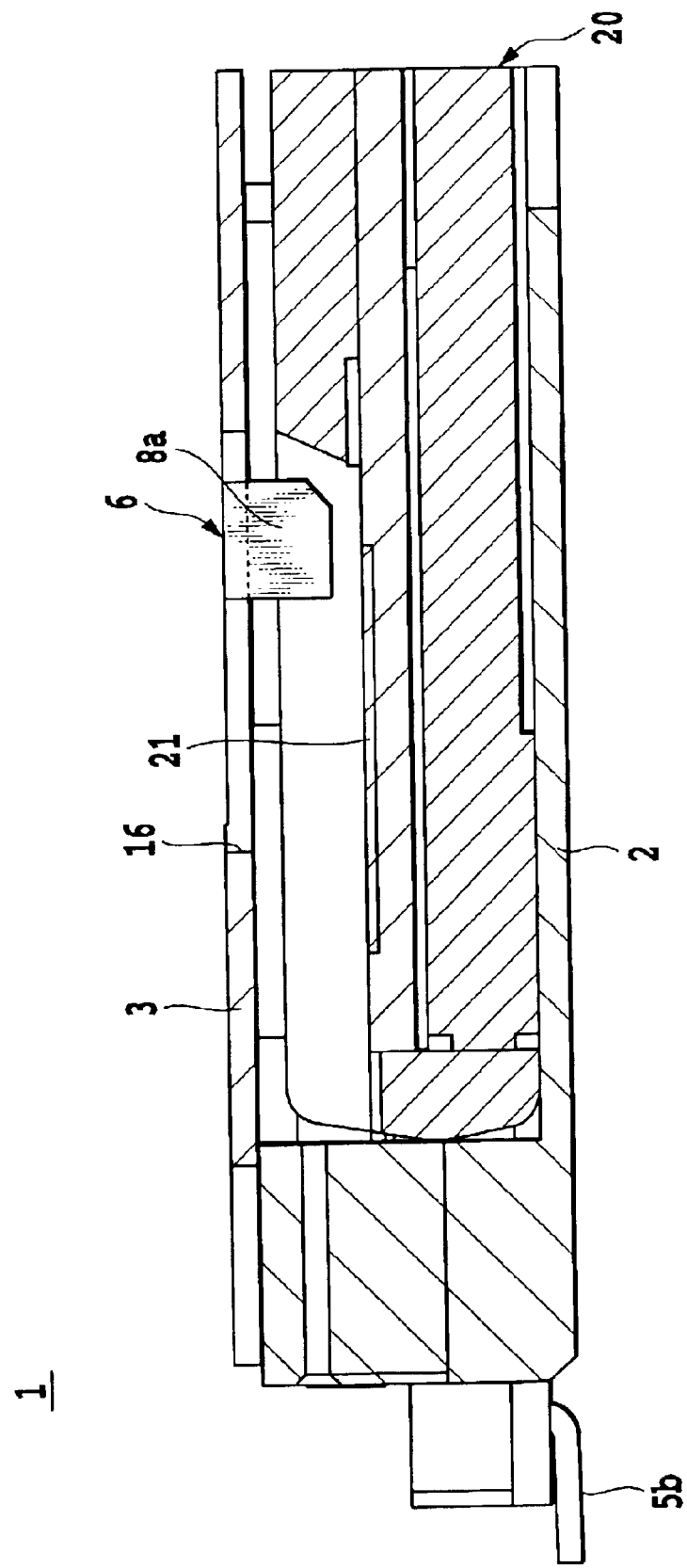
FIG. 6 is a partial sectional view taken along line VI—VI in FIG. 3.
Figure 7:
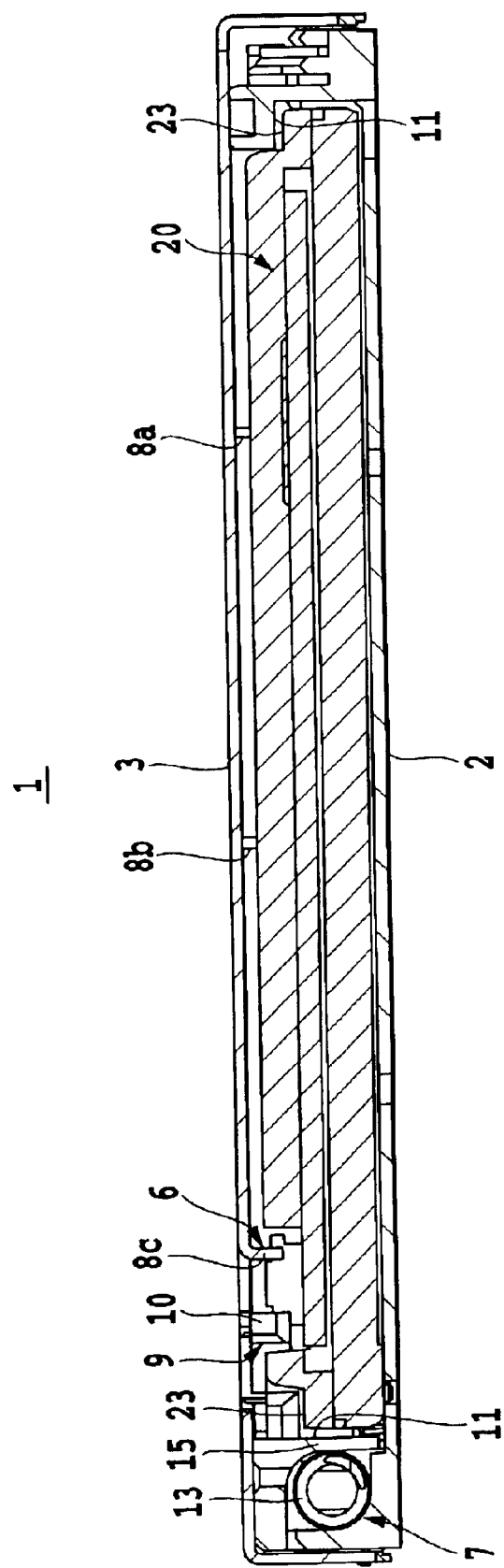
FIG. 7 is a sectional view taken along line VII—VII in FIG. 3.
Figure 8:
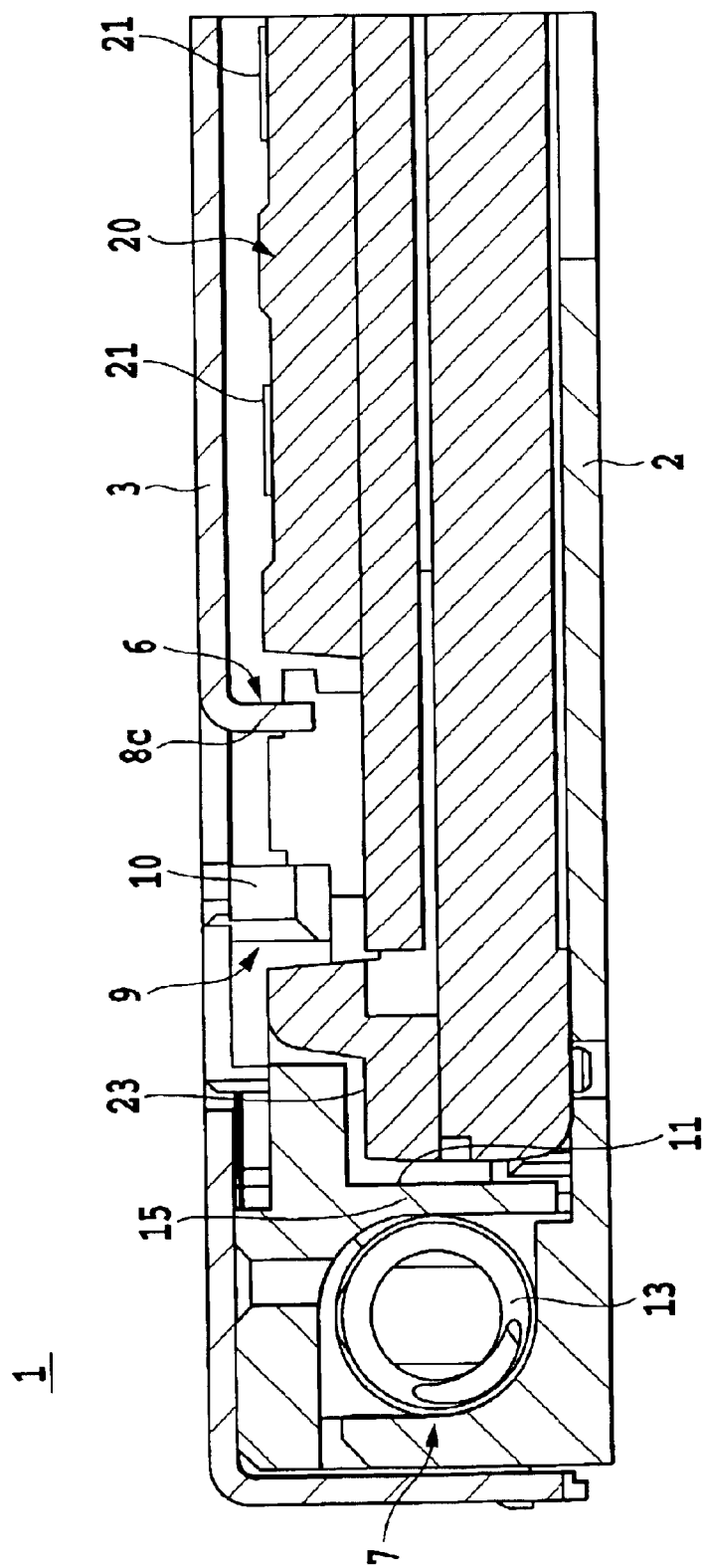
FIG. 8 is an enlarged partial sectional view taken along line VIII—VIII in FIG. 1.

FIGS. 1 to 8 illustrate a first embodiment of a card connector for an IC card according to the present invention, wherein FIG. 1 is a plan view of a card connector for an IC card according to the present invention in which an IC card is inserted therein, FIG. 2 is a perspective view of the card connector for an IC card according to the present invention shown in FIG. 1 from which a sheet metal cover is removed, FIG. 3 is a perspective view of the card connector for an IC card according to the present invention from which the IC card is removed, FIG. 4 is a perspective view of a sheet metal cover of the card connector for an IC card according to the present invention shown in FIG. 3, in which the sheet metal cover is turned over to show projections provided thereon, FIG. 5 is a perspective view of an IC card used for the card connector for an IC card according to the present invention, FIG. 6 is a partial sectional view taken along line VI—VI in FIG. 3, FIG. 7 is a sectional view taken along line VII—VII in FIG. 3, and FIG. 8 is an enlarged partial sectional view taken along line VIII—VIII in FIG. 1.

As shown in FIGS. 1 to 8, the card connector 1 for an IC card according to the present invention is constructed of a hollow and flat housing formed of a substrate 2 and a sheet metal cover 3 in combination with the substrate 2, one end of which is open to define an IC card entrance 4 and the other end is closed to have a plurality of contacts 5 to be electrically connected to the IC card 20.

One example of the IC card used for the card connector 1 for an IC card according to the present invention is shown in FIG. 5. As illustrated, the IC card 20 has a plurality of pads 21 aligned at one end thereof, and a cut section 22 is provided at one corner of the end. Stepped shoulders 23 are provided on opposite sides of the IC card to be fitted with guide grooves 11 of the card connector 1 so that the IC card 20 is guided to slide smoothly. The cut section 22 provided at the one corner of the IC card 20 is brought into contact with a corner wall (not shown) in the card connector 1 to allow a positioning of the IC card 20.

The card connector 1 of the present invention has an erroneous insert prevention mechanism 6 having at least one projection 8a, 8b or 8c for preventing the IC card 20 from being erroneously, for example, oppositely inserted when the IC card 20 is inserted from the IC card entrance 4, and an ejector mechanism 7 for smoothly withdrawing the inserted IC card 20. Further, an anti-floating mechanism 9 having a preventive wall 10 for suppressing the floating-up of the inserted IC card 20 is provided adjacent or near to the ejector mechanism 7 with the card connector 1 of the present invention.

This preventive wall 10 laterally and integrally extends from an upper portion of a holding wall 15 of the ejector mechanism 7 provided along one side of the substrate 2 made of insulating synthetic resin and is formed in a floating manner at a distance from the substrate 2 above the pad 21 of the IC card 20 while covering the cut section 22 of the inserted IC card 20. Accordingly, the preventive wall 10 of the anti-floating mechanism 9 is adapted to cause no short-circuit even though the pad 21 of the IC card 20 is brought into contact or abuts therewith and to suitably suppress the floating-up of the IC card, as well as to guarantee a height from the sheet metal cover 3.

In the card connector 1 according to the present invention, the substrate 2 is molded with an insulating material such as a suitable synthetic resin and made into a hollow and flat housing in combination with the sheet metal cover 3 so that the IC card 20 is inserted thereinto. The ejector mechanism 7 is provided along one side of the substrate 2 of such insulating material so that the IC card 20 is smoothly withdrawn from the card connector 1. Further, the preventive wall 10 is provided as described above to prevent the IC card 20 from floating up relative to the substrate 2. The preventive wall 10 defines the anti-floating mechanism 9.

For example, the ejector mechanism 7 includes an operating member 12 mounted in a hollow elongate holder wall 15 defined in the substrate 2 in a slidable manner, a spring 13 such as a coil spring for applying elastic force onto the operating member 12 and a latch member 14 for latching the operating member 12 so that when the latch member 14 is released, an elastic force stored in the spring 13 pushes the operating member 12 to eject the IC card 20. The ejector mechanism 7 is not limited to such a structure but any of similar type mechanisms may be properly employed.

Against the ejector mechanism 7, the preventive wall 10 of the anti-floating mechanism 9 is provided in a laterally projecting manner from the upper portion of the side surface of the holder wall 15 formed integrally with the substrate 2 so that the preventive wall 10 is disposed in a floating manner at a distance from the substrate 2. Also, since the substrate 2 is made of the insulating synthetic resin as well as the preventive wall 10 of the anti-floating mechanism 9, no short-circuit occurs even if either of them touches the pad 21 of the IC card 20, and also a sufficient height from the sheet metal cover 3 is guaranteed.

Since each of the projections 8a, 8b and 8c is formed so as to extend inward from the sheet metal cover 3 at a height slightly lower than that of the preventive wall 10 of the anti-floating mechanism 9, the IC card 20, if erroneously inserted, may be in contact with any of the projections 8a, 8b or 8c so that the insert of the IC card 20 is inhibited. In this embodiment, although there are three projections 8a, 8b and 8c, the number of the projections is not limited thereto but may be one or two.

Therefore, the IC card 20 is inserted into the card connector 1 through the IC card entrance 4 formed on the front side of the card connector 1, and can be withdrawn therefrom by actuating the operating member 12 by means of the spring 13 upon the release of the latching action of the latch member 14 in the ejector mechanism 7.

The sheet metal cover 3 is formed of a thin metallic plate material such as stainless steel by a blanking or a pressing to have the illustrated shape in which the IC card entrance 4 is formed on the front side and a plurality of openings 16 for the contacts 5 are formed on the rear side. Particularly, the projections 8a, 8b and 8c are bent to extend inward respectively from a lateral side of second, fifth and eighth openings 16 shown in FIG. 3. A position and/or a portion of the opening 16 at which the projection 8a, 8b or 8c is provided may be disposed at anywhere so that it can be properly selected and decided.

While these projections 8a, 8b and 8c are bent parallel to the longitudinal direction of the card connector 1 or the inserting direction of the IC card 20, they may be bent orthogonal to the lateral direction of the card connector 1 or vertical to the inserting direction of the IC card 20, or may of course be bent in any other direction than described above. Also, the number thereof is not limited to one but may be two or three. One or both of an end surface and a side surface of the projection 8a, 8b or 8c or all of the outer circumference thereof may be integrally covered with insulating material such as synthetic resin, for example, by an outsert molding. The molding of such an insulating material covering on the projection 8a, 8b or 8c is not limited to the outsert molding but may be formed by any other suitable means such as an insert molding selected if necessary.

The plurality of contacts 5 to be connected to a printed circuit board (not shown) in an electronic apparatus are provided on the rear side of the card connector 1 and can be electrically connected to the pads 21 of the IC card 20 inserted in the card connector 1.

That is, as shown in FIGS. 2 and 3, the contact 5 is provided at a tip end thereof with an arcuate resilient contact piece 5a brought into contact and connected with the pad 21 of the IC card 20, and at a rear end thereof with a terminal 5b to be properly connected to a printed circuit board of the electronic apparatus by a soldering or others.

According to the card connector 1 for an IC card of the present invention constructed as above mentioned, the IC card 20, for example, of a double-thickness type may be usable. When such an IC card 20 is inserted in a normal state into the card connector 2 through the IC card entrance 4, the pads 21 of the IC card 20 are properly aligned with the contacts 5 to position the resilient contact pieces 5a of the contacts 5 on the pads 21 of the IC card 20 in place, resulting in the favorable connection.

In this case, when the tip end of the IC card 20 is inserted, the resilient contact piece 5a of the contact 5 is pushed upward as seen in FIGS. 2 and 3 to be elastically deformed, and favorably connected onto the pad 21 with a proper elastic contact pressure.

Accordingly, the IC card 20 is electrically connected from the pads 21 to the printed circuit board of the electronic apparatus via the contacts 5. In such a case, if the projections 8a, 8b and 8c are covered with the insulating material of the synthetic resin, the IC card 20 is properly loaded into the card connector 1 without causing short-circuit or the like even if the projection is brought into contact with the pad 21 of the IC pad 20 by any of reasons. Furthermore, the projection 8a, 8b and 8c are favorably provided at positions in ground pad sections of the IC card 20, wherein no wiring for the pad 21 exists, so that a height of the projection 8a, 8b or 8c of the sheet metal cover 3 can be guaranteed. That is, in the card connector 1 for a reverse type IC card, since a structure is adapted in that when the IC card 20 is erroneously inserted, more than a certain length of the IC card 20 is inhibited from entering the card connector by the projections 8a, 8b and 8c extended from the cover 3, a certain height of the projection is necessary. If the height of the projection becomes higher, however, there may be some times a risk of contact thereof with the pad 21 of the IC card 20, which may result in damaging the circuit of the IC card 20. To avoid such troubles, the projections 8a, 8b and 8c are preferably disposed in the ground pad sections of the IC card 20 apart from the wiring section of the pad 21 so that even if the projections 8a, 8b and 8c of the sheet metal cover 3 is brought into contact with the ground pad sections of the IC card 20, no damage occurs on the IC card 20 because of the ground pad section.

Also, even if the IC card 20 is erroneously inserted so that the rear end is directed forward, the rear end of the IC card 20 abuts any one of the projections 8a, 8b and 8c whereby the advance of the IC card 20 is inhibited. Thus, the projections 8a, 8b and 8c act effectively as a stopper for properly inhibiting the erroneous insert of the IC card 20. In such a manner, the erroneous insert prevention mechanism 6 formed of the projections 8a, 8b and 8c is suitably operated.

The card connector 1 for an IC card of the present invention, as mentioned above, is formed of the substrate 2 and the sheet metal cover 3 in combination with the substrate 2 forming the hollow flat housing, and the erroneous insert prevention mechanism 6 is structured with the projections 8a, 8b, 8c on the sheet metal cover 3 being bent inwardly. According to such construction, projections 8a, 8b, 8c can be easily formed only by bending portions of the sheet metal cover 3, and further, the anti-floating mechanism 9, which is can be constituted by the preventive wall 10 laterally extending from the holder wall 15 of the ejector mechanism 7 provided on the substrate 2 of the insulating material properly suppresses the floating-up of the IC card due to the wrench or twist of the inserted IC card 20, whereby the following effects are obtainable: The IC card 20 is suitably maintained and protected. The resilient contact piece 5a of the contact 5 is protected so as not to buckle. No short-circuit accident occurs. The opposite insert of the IC card 20 is assuredly prevented, wherein the rear end of the card is directed forward. Further, since the card connector 1 is formed by the substrate 2 of the insulating material combined with the sheet metal cover 3, a thickness of the card connector itself becomes smaller to result in a low-height card connector.

Second Embodiment

Figure 9:
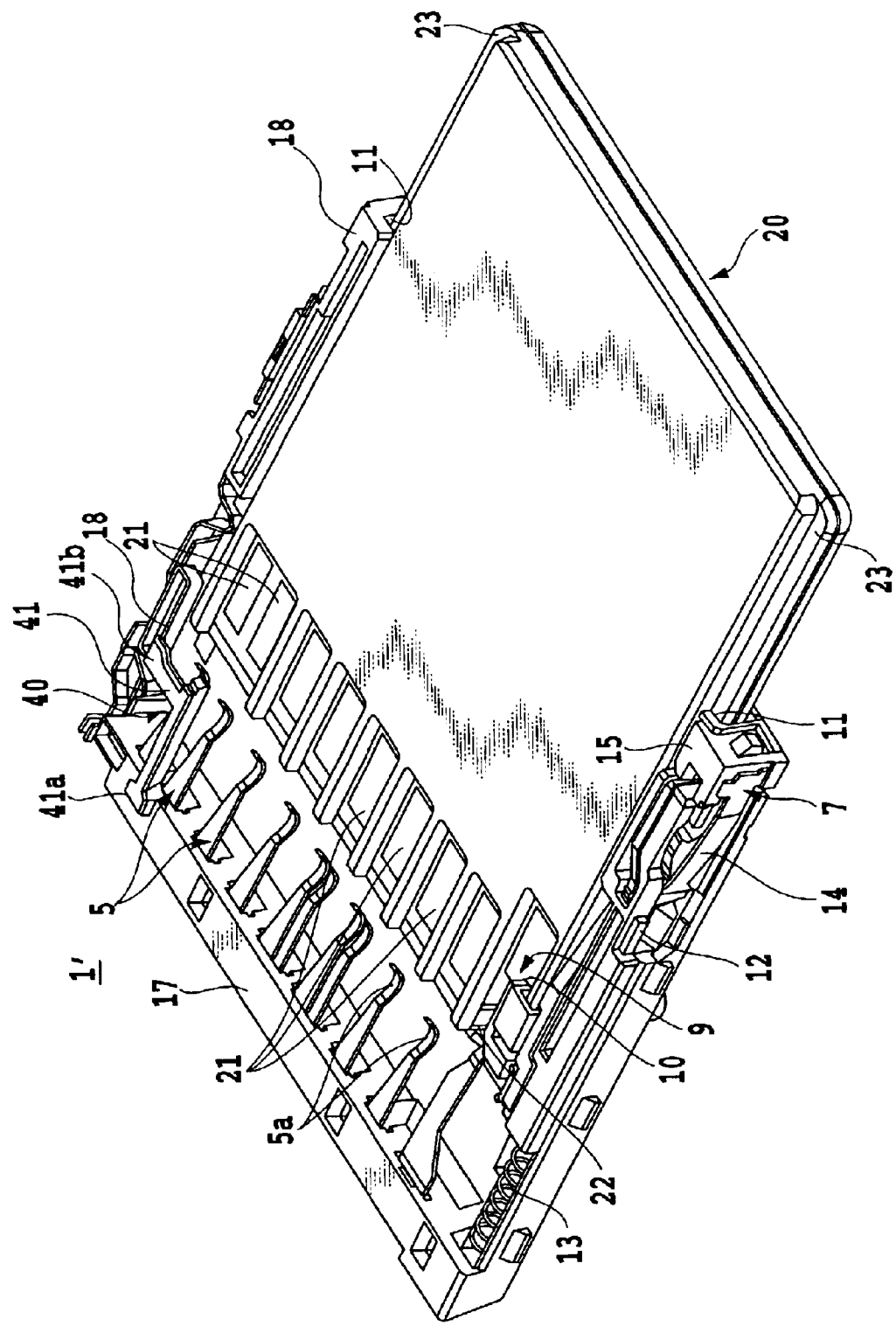
FIG. 9 is a perspective view of the card connector for an IC card in the second embodiment of the present invention from which the sheet metal cover is removed.
Figure 10:
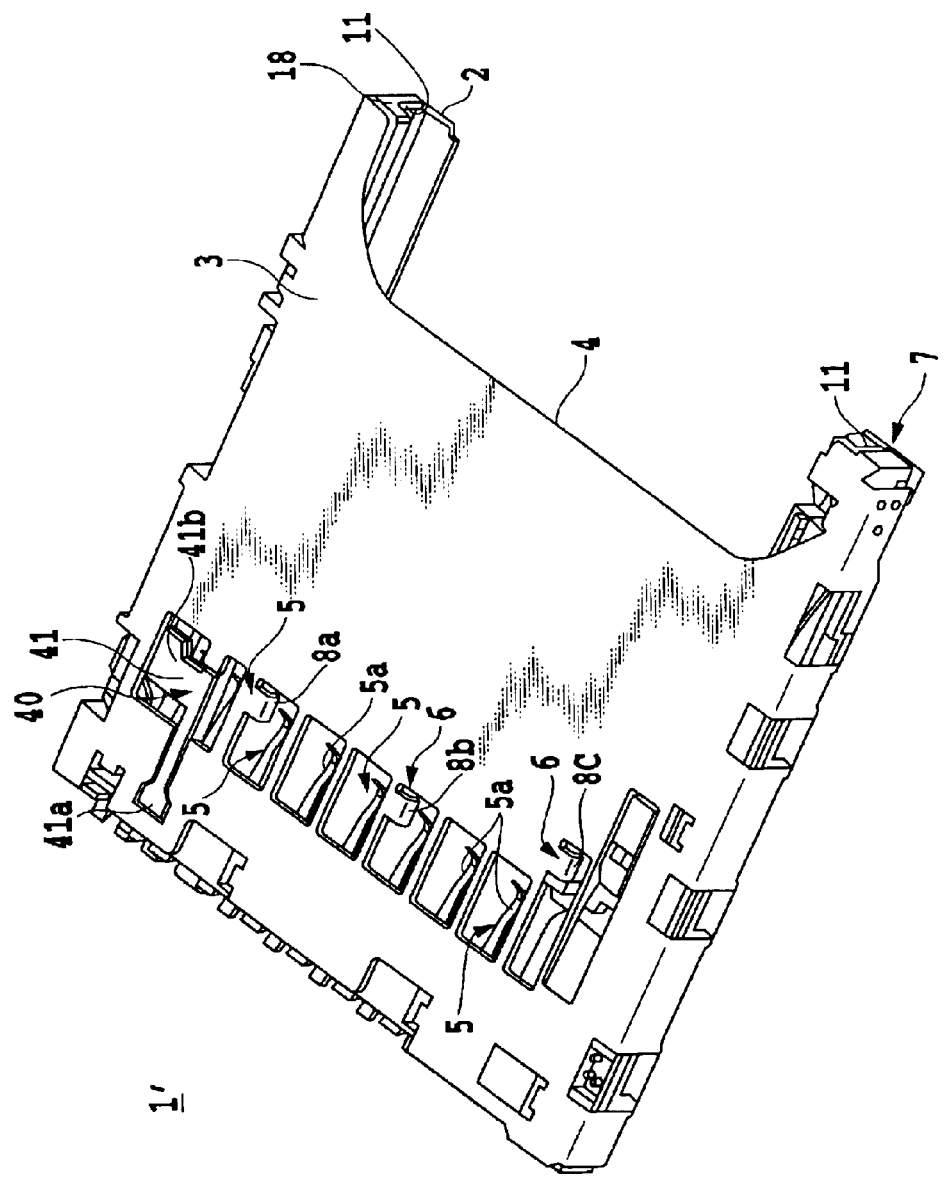
FIG. 10 is a perspective view of the card connector for an IC card in the second embodiment in FIG. 9 of the present invention from which the IC card is removed.

FIGS. 9 and 10 illustrate the second embodiment of the card connector for an IC card of the present invention, FIG. 9 is a perspective view of the card connector in the second embodiment of the present invention from which the sheet metal cover is removed, and FIG. 10 is a perspective view of the card connector in the second embodiment of the present invention from which the IC card is removed.

As shown in FIGS. 9 and 10, the card connector for an IC card of the present invention substantially the same as the card connector for an IC card in the first embodiment, except that a preventive wall is further added to the other side of the substrate as another anti-floating mechanism. Accordingly, the same reference numerals are used in the drawings for denoting the same components.

The card connector 1' for an IC card in the second embodiment according to the present invention is provided with the other anti-floating mechanism 40 on a side wall 18 opposite to the holder wall 15 on which the ejector mechanism 7 is arranged. That is, as shown in FIGS. 9 and 10, the anti-floating mechanism 40 of the second embodiment according to the present invention is constituted by a generally L-shaped preventive wall 41 provided at a corner at which an end wall 17 and the side wall 18 of the substrate 2 are crossed, so that one leg 41a of the generally L-shaped preventive wall 41 is formed integrally with the end wall 17 of the substrate 2 and extends from the upper portion of the end wall 17 in the longitudinal direction (the IC card inserting direction) in a floating-up manner, and the other leg 41b is formed integrally with the end wall 17 and extends from the upper portion of the side wall 18 in the lateral direction similarly in a floating-up manner. Thus the L-shaped preventive wall 41 is held in a floating-up manner with a gap from the substrate 2.

Accordingly, the inserted IC card 20 is positioned in the gap between the substrate 2 and the preventive wall 41, whereby the preventive wall 41 is located above the pad 21 of the IC card 20 to properly suppress the floating-up of the IC card 20. The preventive wall 41 of the anti-floating mechanism 40 may be provided separately from the preventive wall 10 of the aforementioned anti-floating mechanism 9 on the ejector mechanism 7 side or may of course be associated with each other.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector for an IC card comprising a substrate and a cover combined with the substrate to form a flat hollow housing, in which an ejector mechanism is provided along a holding wall on one side of the substrate, wherein said ejector mechanism along the holding wall comprises a preventative wall integrally projecting from an upper portion of the holding wall, and wherein the preventative wall is configured to suppress a floating up of the IC card by contacting a contact pad of the IC card.

2. A card connector as claimed in claim 1, wherein said preventative wall is made of an insulating material.

3. A card connector as claimed in claim 1, wherein said cover comprises a projection extending toward said substrate for stopping the IC card when erroneously inserted.

4. A card connector as claimed in claim 3, wherein said projection is formed in a folding manner from said cover toward said substrate.

5. A card connector as claimed in claim 4, wherein said projection is coated with a resin material.

6. A card connector for a IC card comprising a substrate and a cover combined with the substrate to form a flat hollow housing, in which an ejector mechanism is provided on one side of the substrate, wherein said ejector mechanism on its holding wall comprises a first preventative wall integrally projecting from an upper portion of the holding wall, wherein the preventative wall is configured to suppress a floating up of the IC card by contacting a contact pad of the IC card; and further wherein the other side wall of said substrate comprises a second preventative wall.

7. A card connector as claimed in claim 6, wherein said second preventative wall is disposed in a corner at which an end wall crosses a side wall.

8. A card connector for an IC card comprising a substrate and a cover combined with the substrate to form a flat hollow housing, in which an ejector mechanism is provided on one side of the substrate, wherein said ejector mechanism has a sidewall, saidside wall comprises a preventative wall integrally projecting from the upper portion of the side wall, and wherein the preventative wall is configured to suppress the floating up of the IC card by contacting a contact pad of the IC card.

9. A card connector as claimed in claim 8, wherein said preventative wall is made of an insulating material.

10. A card connector as claimed in claim 8, wherein said cover is provided with a projection extending toward said substrate for stopping the IC card when erroneously inserted.

11. A card connector as claimed in claim 10, wherein said projection is formed in a folding manner from said cover toward said substrate.

12. A card connector as claimed in claim 11, wherein said projection is coated with a resin material.

13. A card connector for an IC card comprising a substrate and a cover combined with the substrate to form a flat hollow housing, in which an ejector mechanism is provided on one side of the substrate, wherein said ejector mechanism on its side wall comprises a first preventative wall integrally projecting from an upper portion of the ejector mechanism wherein said cover is provided with a projection extending toward said substrate for preventing the IC card from being erroneously inserted, wherein the preventative wall is configured to suppress a floating up of the IC card by contacting a contact pad of the IC card; and further wherein the other side wall of said substrate comprises a second preventative wall.

* * * * *

UNITED STATES PATENT AND TRADEMARK OFFICE
CERTIFICATE OF CORRECTION

PATENT NO. : 6,851,959 B2
APPLICATION NO. : 10/212869
DATED : February 8, 2005
INVENTOR(S) : Masaaki Ooya et al.

It is certified that error appears in the above-identified patent and that said Letters Patent is hereby corrected as shown below:

Column 8, line 3, "a IC" should read --an IC--;

Column 8, line 23, "sidewall, saidside" should read --side wall, said side--; and Column 8, line 47, "mechanism" should read --mechanism,--.

Signed and Sealed this

Sixth Day of March, 2007

JON W. DUDAS
*Director of the United States Patent and Trademark Office*